United States Patent
Chang et al.

(10) Patent No.: US 10,339,534 B2
(45) Date of Patent: Jul. 2, 2019

(54) SEGREGATION OF CHAT SESSIONS BASED ON USER QUERY (71) Applicant: [24]7.AI, INC., San Jose, CA (US)

(72) Inventors: Andrew Chang, Palo Alto, CA (US); R. Mathangi Sri, Bangalore (IN); Vaibhav Srivastava, Bangalore (IN)

(73) Assignee: [24]7.ai, Inc., San Jose, CA (US)

( * ) Notice: Subject to any disclaimer, the term of this patent is extended or adjusted under 35 U.S.C. 154(b) by 908 days.

(21) Appl. No.: 14/172,838

(22) Filed: Feb. 4, 2014

(65) Prior Publication Data
US 2014/0222528 A1 Aug. 7, 2014

Related U.S. Application Data (60) Provisional application No. 61/761,061, filed on Feb. 5, 2013.

(51) Int. Cl.
G06Q 30/00 (2012.01)
G06Q 10/10 (2012.01)
H04L 12/58 (2006.01)

(52) U.S. Cl.
CPC ......... *G06Q 30/016* (2013.01); *G06Q 10/107* (2013.01); *H04L 51/02* (2013.01)

(58) Field of Classification Search
CPC .................. G06Q 30/016; G06Q 10/107
See application file for complete search history.

(56) References Cited

U.S. PATENT DOCUMENTS

| 8,379,830 | B1* | 2/2013 | Naik | H04M 3/493 379/265.02 |
| 2010/0325583 | A1* | 12/2010 | Aarni | G06F 17/30038 715/833 |
| 2010/0332287 | A1 | 12/2010 | Gates et al. | |
| 2012/0130771 | A1* | 5/2012 | Kannan | G06Q 10/06398 705/7.32 |
| 2013/0110498 | A1* | 5/2013 | Bekkerman | G06F 17/2745 704/9 |
| 2013/0317804 | A1* | 11/2013 | Hershey | G06F 17/30286 704/9 |

OTHER PUBLICATIONS

International Search Report and Written Opinion from Counterpart International Application No. PCT/US2014/014851, dated Jul. 8, 2014, International Filing Date Feb. 5, 2014.*
A Semantic Architecture for Artificial Conversations; Chayan Chakrabarti; George F. Luger; Nov. 20-24, 2012 (Year: 2012).*

* cited by examiner

*Primary Examiner* — Deirdre D Hatcher
(74) *Attorney, Agent, or Firm* — Perkins Coie LLP (57) ABSTRACT

Embodiments of the invention relate to chat and, more particularly, to determining an that is to be action taken based on the type of chat session. The resolution of the chat is categorized to decide the necessary steps taken and also to monitor the agent's performance. A chat filter extracts relevant portions of a chat session. The relevant factors are taken into consideration and scored based on the feature vectors. A model is built and the type of resolution is determined. An analysis of the chat session is then performed taking into consideration several factors.

18 Claims, 6 Drawing Sheets

SEGREGATION OF CHAT SESSIONS BASED ON USER QUERY

CROSS REFERENCE TO RELATED APPLICATIONS

This application claims priority to U.S. provisional patent application Ser. No. 61/761,061, filed Feb. 5, 2013, which is incorporated herein in its entirety by this reference thereto.

BACKGROUND OF THE INVENTION

Technical Field

The invention relates to online network chat. More particularly, the invention relates to determining an action that is to be taken based on the type of chat session.

Description of the Background Art

Presently, customer care agents and other customer service providers interact with customers over a variety of channels, such as voice, chat, forums, social networks, and so on. These interactions may arise out of such issues as problems faced by the customer, information required by the customer, and so on. Customer queries that must be addressed vary over a wide range of topics belonging to many different domains.

As a result of such interactions, the customer care agent may offer information to the customer, for example in response to a request for information from the customer, such as providing information about a rate plan for a telecommunications network, providing information about an account balance in a financial account, and so on. Such interactions may also result in the customer care agent performing specific actions on behalf of the customer, such as helping the customer troubleshoot an Internet connection issue, helping the customer open a fixed deposit account, and so on.

Currently, once the interaction is completed, no further use is made of the data arising from the interaction.

SUMMARY OF THE INVENTION

Embodiments of the invention relate to chat and, more particularly, to determining an action that is to be taken based on the type of chat session. The resolution of the chat is categorized to decide the necessary steps to be taken and also to monitor the agent's performance. A chat filter extracts relevant portions of a chat session. The relevant factors are taken into consideration and scored based on the feature vectors. A model is built and the type of resolution is determined. An analysis of the chat session is then performed taking into consideration several factors.

DETAILED DESCRIPTION OF THE INVENTION

Embodiments of the invention determine the type of action that is to be taken after an interaction session, while also categorizing the resolution of the interaction. Embodiments of the invention also relate to chat and, more particularly, to determining an; action that is to be taken based on the type of chat session. The resolution of the chat is categorized to decide the necessary steps to be taken and also to monitor the agent's performance. A chat filter extracts relevant portions of a chat session. The relevant factors are taken into consideration and scored based on the feature vectors. A model is built and the type of resolution is determined. An analysis of the chat session is then performed taking into consideration several factors.

Figure 1:
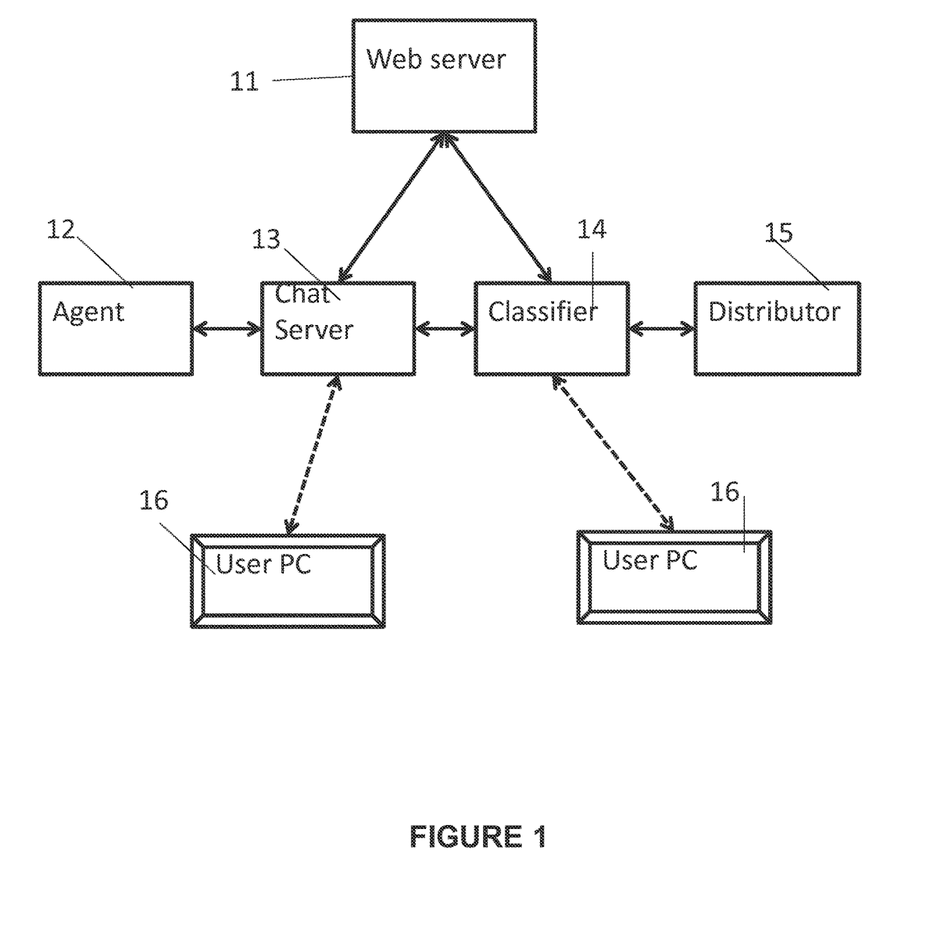
FIG. 1 is a block schematic diagram showing an on-line network chat system according to the invention.

FIG. 1 is a block schematic diagram showing an on-line network chat system according to the invention. In FIG. 1, an online network system comprises a Web server 11, proxy agent 12, chat server 13, classifier 14, distributor 15, and plurality of user personal computers (PCs) 16. The chat system herein is, for example, a computer chat system or a system for real time communication across a computer network. The chat system is preferably arranged for a chat session comprising computer chat across the Internet or other global computer network. The term chat as referred to herein refers to any interaction between the agent and the customer via voice, textual chats, social networks, forums, and so on. The system may also be arranged to support a chat session across any computer network, e.g. a LAN, WAN, or intranet.

The chat server 13 enables an on-line conference or chat room to be established, by which a plurality of client computers can communicate with one another in real time. Typically, communication between clients involves exchanging messages in the form of text, e.g. in the case of text chats, forums, social networks, and so on, or voice, e.g. using VoIP, telephones, and so on. Further, the chat server enables a conference to be established among one or more of a plurality of customer chat clients across a computer network such as the Internet.

A chat session is facilitated by software operating at client stations, e.g. customers and/or chat participants, and at a Web server 11 that is hosted somewhere on a network at an identifiable internet protocol (IP) address. A chat session is typically hosted by a facilitator which implements the rules and regulations governing each session. A single agent 12 may effectively host more than one and up to several ongoing chat sessions simultaneously. In a situation such as this, certain parameters regarding the chat sessions themselves and the agents hosting them are typically observed. Such parameters can include, for example, average handle time, average length of interaction, number of agent lines, number of customer lines, number of concurrent interactions for each agent, etc.

Figure 2A:
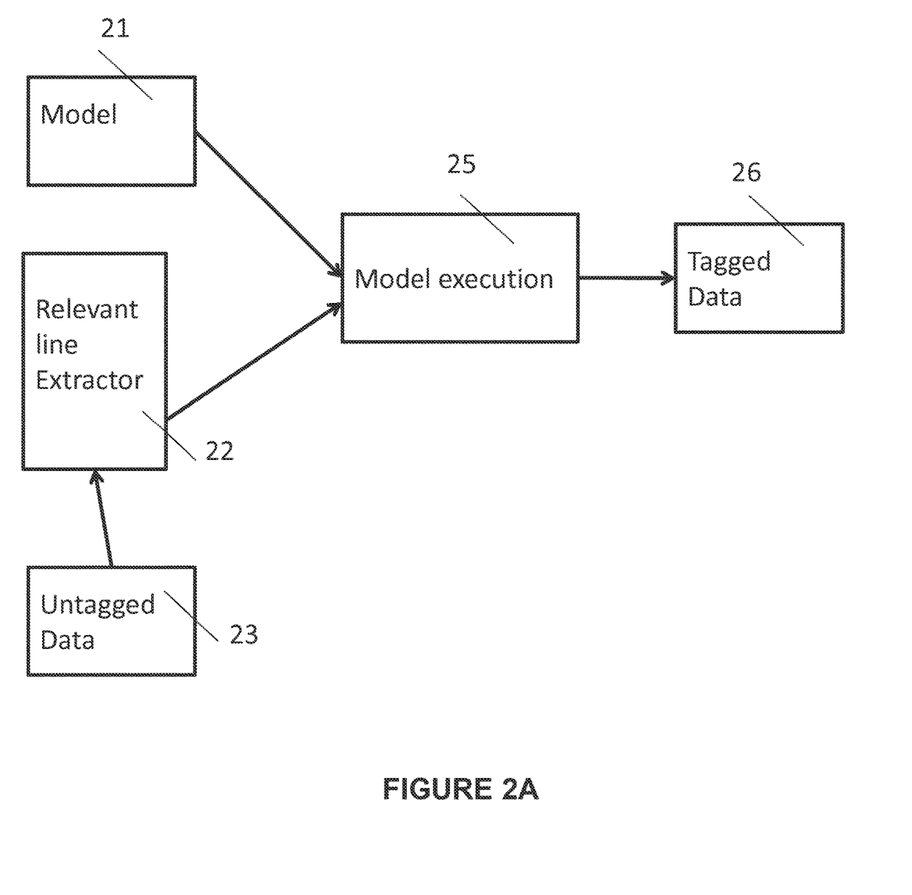
FIGS. 2A and 2B are block schematic diagrams showing model execution to classify chat sessions according to the invention.
Figure 2B:
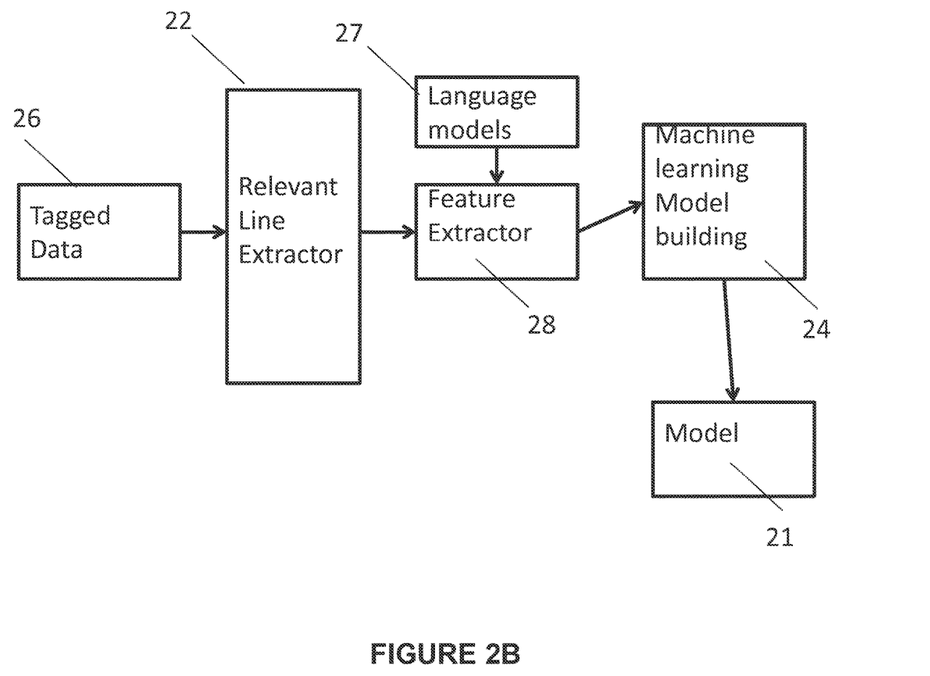

FIGS. 2A and 2B are block schematic diagrams showing model execution to classify chat sessions according to the invention. Initially, relevant sections in a chat session are filtered by a chat filter. The chat filter allows selection of lines of text typed by the customer only, by the agent only, or by both. It may also be used to remove any irrelevant or non-informative lines and/or phrases, such as greetings, authentication, closure, etc.

In FIG. 2A, untagged data 23 from one or more chat sessions is processed through a relevant line extractor 22. Extraneous and/or irrelevant lines, phrases, or tags such as greetings, welcome tones, and so on are removed from the chat by the relevant line extractor, i.e. the chat filter, as discussed above. The output of the relevant line extractor, along with a model 21, is input into model execution module 25 and tagged data 26 is output. These lines of text may further be preprocessed, which may involve several steps such as reshaping data; masking text patterns, for example different date patterns, digit patterns, phone numbers, credit card numbers, company names, URLs, etc.; converting to lower case; removing numbers; removing punctuation; tokenization; stemming; part-of-speech tagging; lemmatization; etc.

FIG. 2B depicts the process of model building from trained data samples, wherein text interactions are labeled, annotated, or tagged during the tagging process from which a model is built. FIG. 2A shows the process of model scoring or model execution, wherein a trained model is applied on any interaction data to predict the labels. In FIG. 2B, the tagged data 26 (see FIG. 2A) is input to a relevant line extractor 22 and thereafter to a feature extractor 28 that uses language models 27 to parse the chat sessions and extract relevant or important features. The features may be, for example, most frequent n-grams; most discriminatory n-grams; rules, e.g. AND, OR, proximity, or any other more complex rules; any structured data, such as, handle times, delays in response, etc. In an embodiment, the feature extractor 28 uses a natural language model to extract the part of speech (POS) tags that can be used as features. The feature selection may be performed based on mutual information, binormal separation, tf-idf, pca, or any other machine learning algorithm.

The output of the feature extractor is provided to a model building module 24, which is responsible for building machine learning models based on the tagged data 26. During a model execution stage, the model 21 and untagged data 23 are considered and classified into either an action-based chat session or an information-based chat session.

The classifier 14 (see FIG. 1) obtains data matrices and uses different classification algorithms to label the matrices. The matrices comprise cleansed, transformed, and structured representations of the original, transcribed or typed, unstructured text interaction history. These representations may also be combined with additional structured data gathered by the platform or system, for example, interaction times, Web traversal history, etc.

The classifier or the model may be built in a supervised or an unsupervised approach.

Supervised models require tagging or manual annotation, i.e. labeling of data, from which the model learns in the model building or model learning process. Some examples of supervised models include, decision trees, SVMs, random forests, etc.

Unsupervised models may also be used, such as, kmeans clustering, hierarchical clustering, etc.

Once the model is trained, i.e. during model building, by providing labeled response variables and a set of structured input features, and further validated for model lift, accuracy, etc. during the model testing or model validation phase, the model may be used for model scoring. In model scoring, for a given set of structured input features, the model can predict the response variable. The classifier can be configured to give a different number of maximum labels to every document.

The chat session may be in the form of text chat that is transcribed text or that is obtained through social media, forums, and the like. The process of classifying resolutions in a chat session comprises three phases, including a training phase, a testing phase, and an application phase. Examples of a resolution of one or more queries include an information-based query where an agent provides price information for a product, or provides detailed information regarding product insurance, in response to corresponding customer queries. Examples of an action request-based query include an agent canceling services on request of a customer, or the agent updating account information on behalf of the customer.

Figure 3:
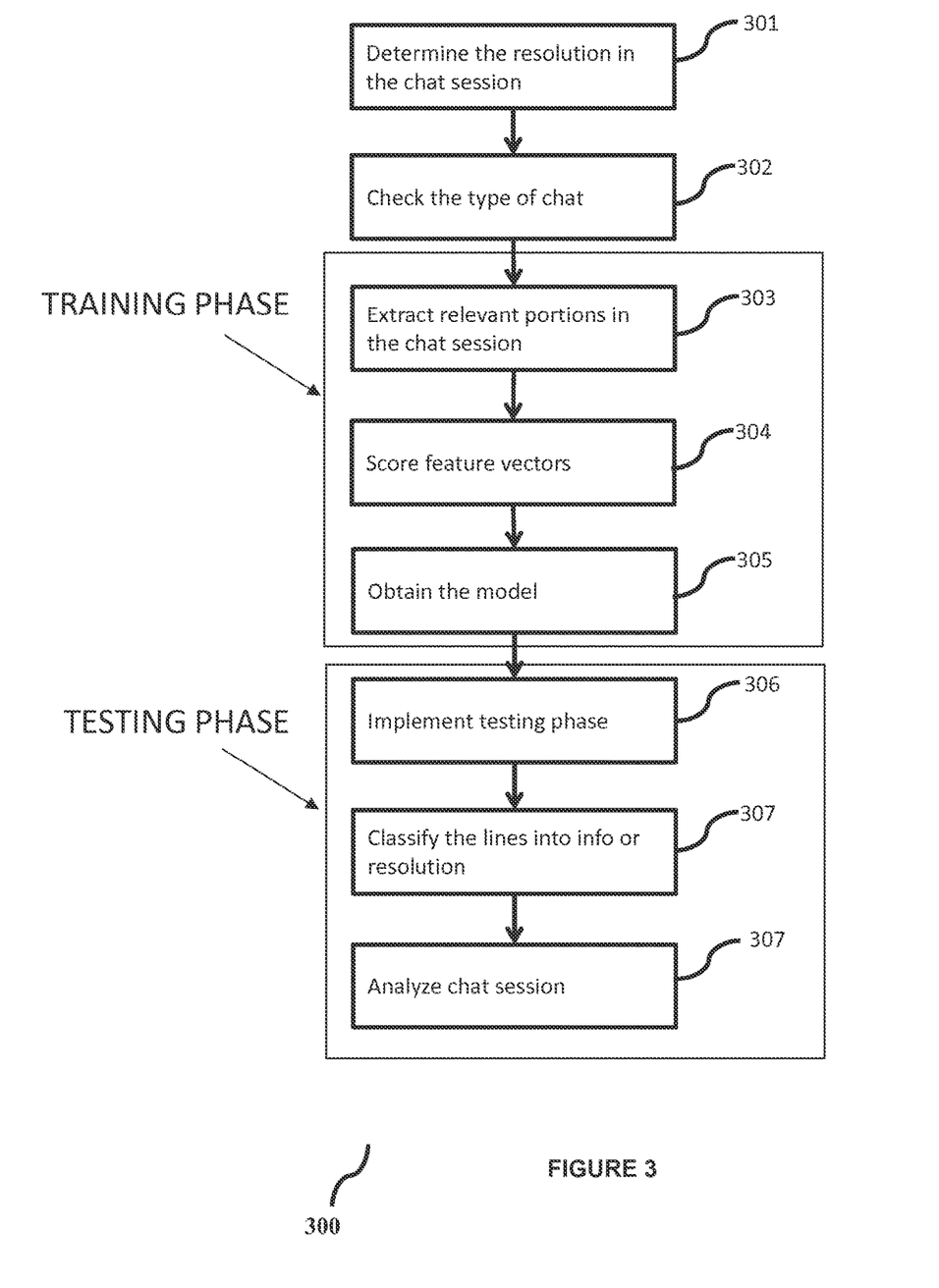
FIG. 3 is a flow diagram showing classification of resolutions in a chat session according to the invention.

FIG. 3 is a flow diagram showing classification 300 of resolutions in a chat session according to the invention. Initially, the type of resolution is to be determined (301) in the chat session. The chat session can either be an information-based chat query or an action request-based chat query. Further, the mode of chat is checked (302). Such modes can include, for example, social media, chat text, voice, etc. The mode is checked to determine if the content, i.e. what is being said by the customer and/agent in the textual chat session, is any of a text chat, a transcribed text chat, social media, or forums.

A training phase is then implemented. During the training phase, a chat filter extracts (303) relevant portions of the chat. Feature extraction is performed to obtain feature vectors. Scores are generated for each category of resolution or action type, based on the probability or likelihood of each category and the final assignment of a predicted label or tag, based on the most likely category by ranking the categories by their scores. The scores thus obtained are determined according to category relevancy and the feature vectors are then scored (304) The feature vectors consider factors such as weightages assigned to word count, type of words used, and so on. A model 21 (see FIG. 2A) is also built and obtained (305)

A testing phase is then implemented (306), in which a chat filter extracts relevant portions of the chat session. An initial pre-processing is performed. Feature extraction is implemented to obtain feature vectors. The lines, i.e. relevant lines of text output from the line extractor and/or filter, are then scored based on the output of the line extractor 22 (see FIG. 2A) and classified (307) into an information-based or an action-based type of chat.

The chats may also be further categorized into sub-categories of an information-based or action-based type of chat. Examples of sub-categories can include, 'mail sent,' 'agent provided customer the steps to resolve the issue,' 'agent provided the customer with information about the current air fares,' 'agent changed the status of a customer,' and so on.

Finally, analysis (308) of the chat session is performed The analysis considers such factors, for example, as the time taken, type of chat, recommendations provided, and so on.

After the model is validated against labeled data during the model testing phase, the model is used for scoring data on unlabeled data in the application stage.

Those skilled in the art will appreciate that the various actions set forth in FIG. 3 may be performed in the order presented, in a different order, or simultaneously. Further, in some embodiments of the invention, some of the actions listed in FIG. 3 may be omitted.

Figure 4:
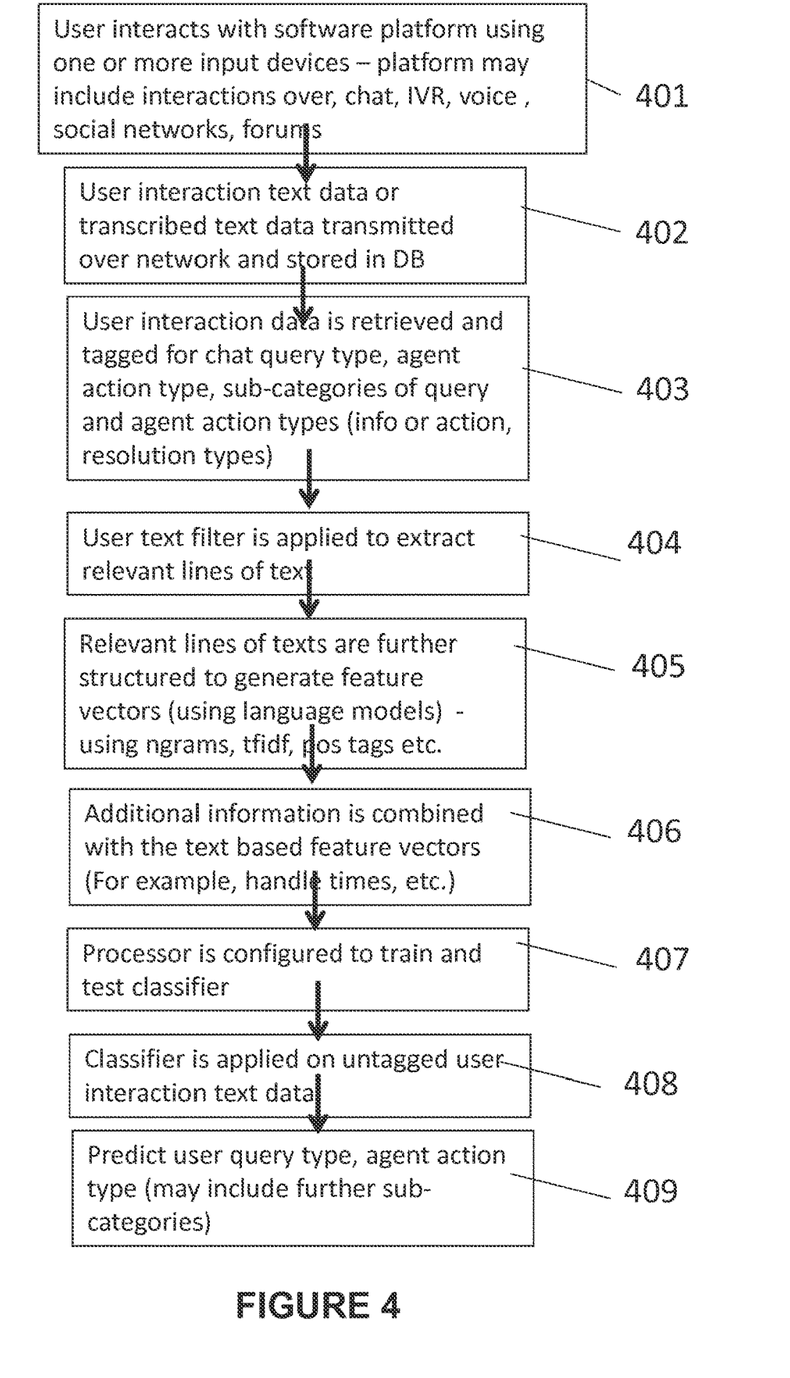
FIG. 4 is a flow diagram showing a process for segregating chat session based on user queries according to the invention.

FIG. 4 is a flow diagram showing a process for segregating chat session based on user queries according to the invention. In FIG. 4, a user interacts with the software platform using one or more input devices (401). The platform may include interactions over, chat, IVR, voice, social networks, forums, etc. User interaction text data or transcribed text data is transmitted over the network and stored in a database (402). User interaction data is retrieved and tagged for chat query type, agent action type, sub-categories of query and agent action types (info or action, resolution types) (403). A user text filter is applied to extract relevant lines of text (404). Relevant lines of texts are further structured to generate feature vectors using, for example, language models, ngrams, tfidf, pos tags, etc. (405). Additional information is combined with the text-based feature vectors, for example, handle times, etc. (406). The processor is configured to train and test a classifier (407). The classifier is applied on untagged user interaction text data (408). The system then predicts user query type and/or agent action type, which may include further sub-categories (409).

Computer Implementation

Figure 5:
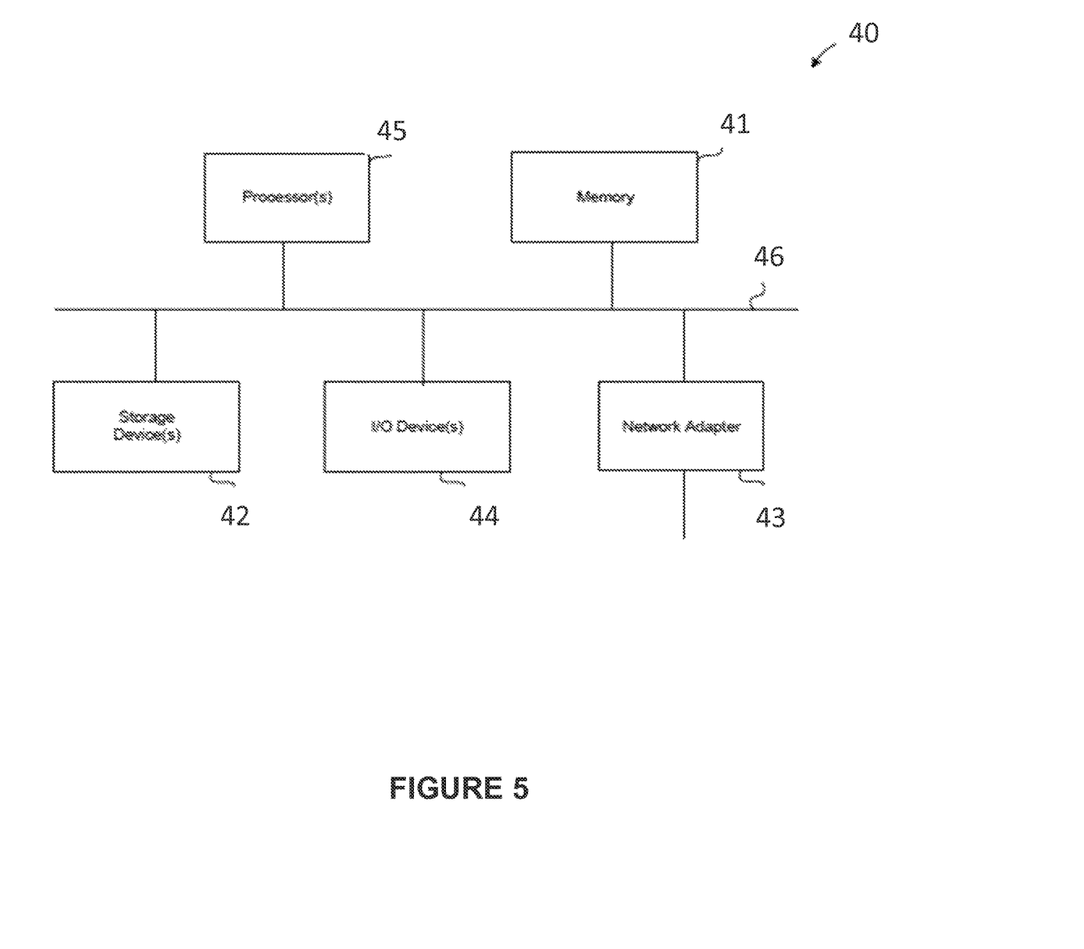
FIG. 5 is a block schematic diagram showing a machine in the example form of a computer system within which a set of instructions for causing the machine to perform one or more of the methodologies discussed herein may be executed.

FIG. 5 is a block diagram of a computer system that may be used to implement certain features of some of the embodiments of the invention. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions, sequential or otherwise, that specify actions to be taken by that machine.

The computing system 40 may include one or more central processing units ("processors") 45, memory 41, input/output devices 44, e.g. keyboard and pointing devices, touch devices, display devices, storage devices 42, e.g. disk drives, and network adapters 43, e.g. network interfaces, that are connected to an interconnect 46.

In FIG. 5, the interconnect is illustrated as an abstraction that represents any one or more separate physical buses, point-to-point connections, or both connected by appropriate bridges, adapters, or controllers. The interconnect, therefore, may include, for example a system bus, a peripheral component interconnect (PCI) bus or PCI-Express bus, a Hyper-Transport or industry standard architecture (ISA) bus, a small computer system interface (SCSI) bus, a universal serial bus (USB), IIC (12C) bus, or an Institute of Electrical and Electronics Engineers (IEEE) standard 1394 bus, also referred to as Firewire.

The memory 41 and storage devices 42 are computer-readable storage media that may store instructions that implement at least portions of the various embodiments of the invention. In addition, the data structures and message structures may be stored or transmitted via a data transmission medium, e.g. a signal on a communications link. Various communications links may be used, e.g. the Internet, a local area network, a wide area network, or a point-to-point dial-up connection. Thus, computer readable media can include computer-readable storage media, e.g. non-transitory media, and computer-readable transmission media.

The instructions stored in memory 41 can be implemented as software and/or firmware to program one or more processors to carry out the actions described above. In some embodiments of the invention, such software or firmware may be initially provided to the processing system 40 by downloading it from a remote system through the computing system, e.g. via the network adapter 43.

The various embodiments of the invention introduced herein can be implemented by, for example, programmable circuitry, e.g. one or more microprocessors, programmed with software and/or firmware, entirely in special-purpose hardwired, i.e. non-programmable, circuitry, or in a combination of such forms. Special-purpose hardwired circuitry may be in the form of, for example, one or more ASICs, PLDs, FPGAs, etc.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented chat analysis method, comprising:

providing a processor, said processor creating and using a model for classifying resolutions in a chat session in phases comprising a model training phase, a model testing phase, and a model application phase;

during said model training phase, a first chat filter extracting relevant portions of a chat session;

said processor performing feature extraction on said relevant portions of said chat session to obtain feature vectors;

said processor determining said feature vectors according to category relevancy;

said processor scoring said feature vectors based on a probability or likelihood of classifying said feature into a particular one of a plurality of categories;

said processor ranking said categories by their scores; and based on a most likely category, as determined by said ranking, said processor making a final assignment of a predicted classification of said feature;

during said model testing phase, a second chat filter extracting relevant portions of a chat session;

said processor analyzing said chat session;

said processor validating said model against labeled data; and during said model application phase, said processor receiving user chat information comprising a user interaction during a chat session across a computer network from a computer chat system or a system for real time communication across said computer network;

said processor extracting unlabeled data from said user chat information;

said processor scoring said unlabeled data with said model;

during said chat session, said processor analyzing said user interaction with said model to predict a type of chat session;

said processor determining whether said chat session comprises an information based chat query or an action request-based chat query;

based upon said type determination, said processor determining an action to take in connection with said chat session;

when said chat session comprises an information based chat query, providing responsive information to said user; and when said chat session comprises an action request-based chat query, performing a responsive action on behalf of the user.

2. The method of claim 1, further comprising: said processor monitoring an agent's performance.

3. The method of claim 1, wherein a chat session comprises any interaction between an agent and a customer via any of voice, textual chats, social networks, and forums.

4. The method of claim 1, further comprising:
said processor providing a classifier that obtains data matrices from said chat sessions; and
said processor applying a classification algorithm to label said matrices.

5. The method of claim 4, wherein said classifier provides a different number of maximum labels for each of a plurality of chat-related documents.

6. The method of claim 1, further comprising:
said processor processing untagged data from one or more chat sessions through a relevant line extractor to remove any of extraneous and irrelevant lines, phrases, and tags from a chat transcript.

7. The method of claim 6, further comprising:
said processor processing an output of said relevant line extractor, along with a model, to generate tagged data.

8. The method of claim 7, further comprising:
said processor inputting said tagged data into a relevant line extractor.

9. The method of claim 8, said relevant line extractor further comprising:
a feature extractor using language models to parse chat sessions and to extract any of relevant and important features from said chat sessions.

10. The method of claim 9, further comprising:
said feature extractor using a natural language model to extract part of speech (POS) tags that are used as features.

11. The method of claim 9, further comprising:
said processor providing an output of said feature extractor to a model building module to build machine learning models based on said tagged data.

12. The method of claim 11, further comprising:
during said model execution stage, said processor using a model and untagged data to classify a chat session into any of an action-based chat session and an information-based chat session.

13. The method of claim 1, wherein a chat session comprises text chat that is any of transcribed text and text that is obtained through any of social media and forums.

14. The method of claim 1, further comprising: said processor classifying resolutions in a chat session.

15. The method of claim 1, further comprising:
said processor identifying a mode of chat to determine when chat content is any of a text chat, a transcribed text chat, social media, and a forum.

16. The method of claim 1, wherein said feature vectors comprise factors including any of weightages assigned to word count and type of words used.

17. The method of claim 1, further comprising: said processor performing analysis of the chat session;
wherein said analysis considers factors that comprise any of time taken, type of chat, and recommendations provided.

18. An apparatus for chat analysis, comprising:
a processor creating and using a model for classifying resolutions in a chat session in phases comprising a model training phase, a model testing phase, and a model application phase;
a first chat filter, during said model training phase, extracting relevant portions of a chat session;
said processor performing feature extraction on said relevant portions of said chat session to obtain feature vectors;
said processor determining said feature vectors according to category relevancy;
said processor scoring said feature vectors based on a probability or likelihood of classifying said feature into a particular one of a plurality of categories;
said processor ranking said categories by their scores; and
based on a most likely category, as determined by said ranking, said processor making a final assignment of a predicted classification of said feature;
a second chat filter, during said model testing phase, said second chat filter extracting relevant portions of a chat session;
said processor analyzing said chat session; and
said processor validating said model against labeled data; and
during said model application phase, said processor receiving user chat information comprising a user interaction during a chat session across a computer network from a computer chat system or a system for real time communication across said computer network;
said processor extracting unlabeled data from said user chat information;
said processor scoring said unlabeled data with said model;
during said chat session, said processor analyzing said user interaction with said model to predict a type of chat session;
said processor determining whether said chat session comprises an information based chat query or an action request-based chat query; and
based upon said type determination, said processor determining an action to take in connection with said chat session;
when said chat session comprises an information based chat query, providing responsive information to said user; and
when said chat session comprises an action request-based chat query performing a responsive action on behalf of the user.

* * * * *